US012699028B2

(12) United States Patent
Yagci et al.

(10) Patent No.: US 12,699,028 B2
(45) Date of Patent: Aug. 4, 2026

(54) INTEGRATED SYSTEM FOR PREPARATION OF PATHOLOGY SAMPLES

(71) Applicant: Clarapath, Inc., Hawthorne, NY (US)

(72) Inventors: Baris Yagci, Montclair, NJ (US);
Partha P. Mitra, New York, NY (US);
Charles Cantor, Hawthorne, NY (US);
Eric Feinstein, Hawthorne, NY (US)

(73) Assignee: Clarapath, Inc., Hawthorne, NY (US)

( * ) Notice: Subject to any disclaimer, the term of this patent is extended or adjusted under 35 U.S.C. 154(b) by 1046 days.

(21) Appl. No.: 17/845,763

(22) Filed: Jun. 21, 2022

(65) Prior Publication Data

US 2022/0404241 A1      Dec. 22, 2022

Related U.S. Application Data

(60) Provisional application No. 63/212,980, filed on Jun. 21, 2021.

(51) Int. Cl.
G01N 1/00        (2006.01)
B01L 9/00        (2006.01)
(Continued)

(52) U.S. Cl.
CPC ............ G01N 1/2813 (2013.01); B01L 9/523 (2013.01); G01N 1/06 (2013.01); G01N 1/312 (2013.01); G01N 1/36 (2013.01)

(58) Field of Classification Search
None
See application file for complete search history.

(56) References Cited

U.S. PATENT DOCUMENTS

| | | | |
|---|---|---|---|
| 4,511,224 A | 4/1985 | Sitte et al. | |
| 5,746,855 A | 5/1998 | Bolles | |
| | | (Continued) | |

FOREIGN PATENT DOCUMENTS

| | | |
|---|---|---|
| CN | 110672607 A | 1/2020 |
| CN | 212115045 U | 12/2020 |
| | (Continued) | |

OTHER PUBLICATIONS

International Search Report in PCT International Application No. PCT/US2022/034384 mailed Sep. 21, 2022.
(Continued)

*Primary Examiner* — Jyoti Mutreja
(74) *Attorney, Agent, or Firm* — Greenberg Traurig LLP; Roman Fayerberg; Richard Brooks

(57) ABSTRACT

An integrated pathology system includes a tissue embedding module configured to embed a tissue sample into an embedding material to prepare a tissue block, a sectioning and slide creating module configured to remove one or more tissue sections from the tissue block and place the one or more tissue sections onto one or more slides, a staining module configured to stain the one or more tissue sections on the slides, and a cover-slipper module configured to place a cover onto the one or more stained tissue sections. The system further includes one or more transfer devices configured to integrate the modules and a processor in communication with the modules for controlling one or more processes performed by the modules and the one or more transfer devices for controlling the integration of the modules.

21 Claims, 12 Drawing Sheets

100

(51) Int. Cl.
 *G01N 1/06* (2006.01)
 *G01N 1/28* (2006.01)
 *G01N 1/31* (2006.01)
 *G01N 1/36* (2006.01)

(56) References Cited

U.S. PATENT DOCUMENTS

| | | |
|---|---|---|
| 6,387,653 B1 | 5/2002 | Voneiff et al. |
| 6,568,307 B1 | 5/2003 | Gunther |
| 6,720,191 B1 | 4/2004 | Goldstein et al. |
| 7,374,907 B1 | 5/2008 | Voneiff et al. |
| 8,074,547 B2 | 12/2011 | Ito et al. |
| 8,687,858 B2 | 4/2014 | Walter et al. |
| 9,032,854 B2 | 5/2015 | Yang et al. |
| 9,164,014 B2 | 10/2015 | Ito |
| 9,279,749 B2 | 3/2016 | Donovan et al. |
| 9,354,147 B2 | 5/2016 | Lefebvre |
| 9,488,552 B2 | 11/2016 | Whited |
| 9,933,339 B2 | 4/2018 | Briggman |
| 10,228,311 B2 | 3/2019 | Stephens et al. |
| 10,473,557 B2 | 11/2019 | Mitra et al. |
| 10,571,368 B2 | 2/2020 | Zhang et al. |
| 10,724,929 B2 | 7/2020 | Zhang et al. |
| 11,169,056 B2 | 11/2021 | Mitra et al. |
| 11,435,268 B2 | 9/2022 | Mitra et al. |
| 11,467,071 B2 | 10/2022 | Mitra et al. |
| 11,506,577 B2 | 11/2022 | Zhang et al. |
| 11,609,162 B2 | 3/2023 | Mitra et al. |
| 11,630,035 B2 | 4/2023 | Mitra et al. |
| 11,821,826 B2 | 11/2023 | Mitra et al. |
| 11,874,208 B2 | 1/2024 | Mitra et al. |
| 11,898,948 B2 | 2/2024 | Mitra et al. |
| 11,959,835 B2 | 4/2024 | Mitra et al. |
| 12,158,404 B2 | 12/2024 | Mitra et al. |
| 12,292,360 B2 | 5/2025 | Mitra et al. |
| 12,392,687 B2 | 8/2025 | Zhang et al. |
| 12,405,194 B2 | 9/2025 | Mitra et al. |
| 2003/0022271 A1 | 1/2003 | Voneiff et al. |
| 2003/0120633 A1 | 6/2003 | Torre-Bueno |
| 2004/0011020 A1 | 1/2004 | Nomura |
| 2005/0126311 A1 | 6/2005 | Miyazawa et al. |
| 2005/0235542 A1 | 10/2005 | Metzner et al. |
| 2006/0086221 A1 | 4/2006 | Kong |
| 2007/0039435 A1 | 2/2007 | Kokubo |
| 2007/0141711 A1 | 6/2007 | Stephens et al. |
| 2007/0180965 A1 | 8/2007 | Ito et al. |
| 2007/0199418 A1 | 8/2007 | Ito |
| 2008/0286149 A1 | 11/2008 | Roe et al. |
| 2009/0110253 A1 | 4/2009 | Torre-Bueno |
| 2009/0214088 A1 | 8/2009 | Sorenson et al. |
| 2010/0021037 A1 | 1/2010 | Zahniser et al. |
| 2010/0093022 A1 | 4/2010 | Hayworth et al. |
| 2010/0118133 A1 | 5/2010 | Walter et al. |
| 2010/0279342 A1 | 11/2010 | Kijima et al. |
| 2011/0111435 A1 | 5/2011 | Dobson et al. |
| 2011/0249109 A1 | 10/2011 | Fine et al. |
| 2011/0303352 A1 | 12/2011 | Nakajima et al. |
| 2012/0149050 A1 | 6/2012 | Lapen et al. |
| 2012/0208184 A1 | 8/2012 | Ragan |
| 2013/0164781 A1 | 6/2013 | Lefebvre |
| 2014/0026683 A1 | 1/2014 | Hayworth et al. |
| 2014/0041500 A1 | 2/2014 | Isagawa et al. |
| 2014/0051158 A1 | 2/2014 | Nakajima et al. |
| 2014/0098376 A1 | 4/2014 | Hashimshony |
| 2014/0137715 A1 | 5/2014 | Sneyders et al. |
| 2015/0013512 A1 | 1/2015 | Yang et al. |
| 2015/0017679 A1 | 1/2015 | Ito et al. |
| 2015/0268141 A1 | 9/2015 | Miyatani |
| 2015/0293026 A1 | 10/2015 | Shin et al. |
| 2015/0293133 A1 | 10/2015 | Shoffner et al. |
| 2016/0063724 A1 | 3/2016 | Tunstall et al. |
| 2016/0091400 A1 | 3/2016 | Whited et al. |
| 2016/0139004 A1 | 5/2016 | Witte |
| 2016/0245833 A1 | 8/2016 | Lefebvre |
| 2017/0003309 A1 | 1/2017 | Mitra et al. |

| | | |
|---|---|---|
| 2017/0067800 A1 | 3/2017 | Briggman |
| 2017/0122844 A1 | 5/2017 | Chen |
| 2017/0161428 A1 | 6/2017 | Mitra |
| 2017/0205317 A1 | 7/2017 | Zhang et al. |
| 2017/0276574 A1 | 9/2017 | Webber et al. |
| 2017/0303832 A1 | 10/2017 | Yasui |
| 2017/0328818 A1 | 11/2017 | Zhang et al. |
| 2017/0372471 A1 | 12/2017 | Euren |
| 2018/0108163 A1 | 4/2018 | Remiszewski |
| 2018/0136089 A1 | 5/2018 | Bui et al. |
| 2018/0143214 A1* | 5/2018 | Bueren ............... G02B 21/365 |
| 2019/0176194 A1 | 6/2019 | Chen et al. |
| 2019/0250071 A1 | 8/2019 | Hayworth et al. |
| 2019/0301980 A1 | 10/2019 | Anderson et al. |
| 2019/0355135 A1 | 11/2019 | Rhodes |
| 2019/0368982 A1 | 12/2019 | Schleifer et al. |
| 2020/0041387 A1 | 2/2020 | Rhodes et al. |
| 2020/0064232 A1 | 2/2020 | Mitra et al. |
| 2020/0160522 A1 | 5/2020 | Merlo et al. |
| 2020/0166434 A1 | 5/2020 | Zhang et al. |
| 2020/0388032 A1 | 12/2020 | Chiang et al. |
| 2021/0149174 A1 | 5/2021 | Levenson |
| 2021/0262905 A1 | 8/2021 | Mitra et al. |
| 2021/0262907 A1 | 8/2021 | Mitra et al. |
| 2021/0263055 A1 | 8/2021 | Mitra et al. |
| 2021/0323150 A1 | 10/2021 | Cho |
| 2022/0034768 A1 | 2/2022 | Mitra et al. |
| 2022/0034769 A1 | 2/2022 | Mitra et al. |
| 2022/0042887 A1 | 2/2022 | Mitra et al. |
| 2022/0113228 A1 | 4/2022 | Mitra et al. |
| 2022/0120641 A1 | 4/2022 | Chen et al. |
| 2022/0128810 A1 | 4/2022 | Mitra et al. |
| 2022/0349788 A1 | 11/2022 | Mitra et al. |
| 2022/0364960 A1 | 11/2022 | Smith et al. |
| 2023/0057075 A1 | 2/2023 | Zhang et al. |
| 2023/0126618 A1 | 4/2023 | Mitra et al. |
| 2023/0221222 A1 | 7/2023 | Mitra et al. |
| 2023/0228651 A1 | 7/2023 | Yagci et al. |
| 2023/0359010 A1 | 11/2023 | Chen et al. |
| 2024/0167917 A1 | 5/2024 | Mitra et al. |
| 2024/0288342 A1 | 8/2024 | Mitra et al. |
| 2025/0146914 A1 | 5/2025 | Mitra et al. |

FOREIGN PATENT DOCUMENTS

| | | |
|---|---|---|
| DE | 102011116555 A1 | 4/2013 |
| DE | 10207118304 A1 | 2/2018 |
| EP | 0111290 A2 | 6/1984 |
| JP | S6385426 A | 4/1988 |
| JP | 2000190291 A | 7/2000 |
| JP | 2001324423 A | 11/2001 |
| JP | 2004013435 A | 1/2004 |
| JP | 2008020293 A | 1/2008 |
| JP | 2008134127 A | 6/2008 |
| JP | 2012229993 A | 11/2012 |
| JP | 2012229995 A | 11/2012 |
| JP | 2013535014 A | 9/2013 |
| JP | 2007218616 A | 1/2015 |
| WO | 1997003827 A1 | 2/1997 |
| WO | WO 2010151761 A2 | 12/2010 |
| WO | WO 2012147730 A1 | 11/2012 |
| WO | WO 2015046518 A1 | 4/2015 |
| WO | WO 2015175525 A1 | 11/2015 |
| WO | 2016016795 A1 | 2/2016 |
| WO | 2019209743 A1 | 10/2019 |
| WO | 2021053035 A3 | 3/2021 |
| WO | 2021096950 A1 | 5/2021 |
| WO | WO 2021168457 A1 | 8/2021 |
| WO | WO 2022087443 A1 | 4/2022 |
| WO | 2022241261 A1 | 11/2022 |
| WO | 2022271732 A1 | 12/2022 |
| WO | 2023092156 A1 | 5/2023 |
| WO | 2023122620 A2 | 6/2023 |

(56)         References Cited

OTHER PUBLICATIONS

Willis et al., "Monitoring Cutting Forces with an Instru-
mented Histological Microtome", Journal of Microscopy,
vol. 178, No. 1, pp. 56-65, Apr. 1, 1995.

* cited by examiner

100

306

302

110

108

112

106

104

304

702

700

704

706

Identify tissue sample at the pathology system

Instruct modules of the pathology system to implement processing protocols for the tissue sample Automatically track the tissue sample through the modules of the pathology system Return status updates for the processing of the tissue sample

INTEGRATED SYSTEM FOR PREPARATION OF PATHOLOGY SAMPLES

CROSS-REFERENCE TO RELATED APPLICATION

This application claims the benefit of and priority to U.S. Provisional Application No. 63/212,980, filed Jun. 21, 2021, and the contents of this application is hereby incorporated herein by reference in its entirety.

FIELD

The present disclosure relates to a method and system suitable for an integrated pathology device. In particular, the present disclosure relates to a pathology including processing tissue samples in an integrated setup.

BACKGROUND

Generally, tissue sectioning in a pathology systems and methods involve many steps, some of which are automated. Steps in processing tissue may include grossing, fixing, embedding, sectioning, staining, and cover-slipping. In digital pathology the stained slides can be scanned in a whole slide imager. The automation in this field has been focused on individual steps and not end-to-end automation of the process with the fresh tissue as input and stained slides and their images as the outputs. One of the reasons that this hasn't been possible so far is that sectioning is still a manual process.

SUMMARY

There is a need for improvements for surgical pathology. Specifically, there is a need for a laboratory workflow and a device to connect all the processing steps to improve the speed and consistency of tissue processing. The present disclosure is directed toward further solutions to address this need, in addition to having other desirable characteristics.

The present disclosure relates to an integrated pathology system including: a tissue embedding module configured to embed a tissue sample into an embedding material to prepare a tissue block; a sectioning and slide creating module configured to remove one or more tissue sections from the tissue block and place the one or more tissue sections onto one or more slides; a staining module configured to stain the one or more tissue sections on the one or more slides; a cover-slipper module configured to place a cover onto the one or more stained tissue sections; one or more transfer devices configured to integrate the modules; and a processor in communication with the modules and being programmed to control one or more processes performed by the modules and the one or more transfer devices for controlling the integration of the modules.

In some embodiments, the present disclosure relates to an integrated pathology system further including an imaging module configured to image the one or more covered tissue sections. In some embodiments, the present disclosure relates to an integrated pathology system further including a tissue processing module or station configured to fix a tissue in formalin. In some embodiments, the present disclosure relates to an integrated pathology system further including a tissue grossing module or station configured to receive and process a tissue sample before transporting the tissue sample to the tissue processor. In some embodiments, the present disclosure relates to an integrated pathology system including systems to check and verify tissue quality and enable tissue tracking through-out the system. In some embodiments, the present disclosure relates to an integrated pathology system, wherein the processor is further programmed track the tissue sample through the one or more processes.

The present disclosure relates to a method, including: automatedly embedding a tissue sample into an embedding material to prepare a tissue block at a tissue embedding module; automatedly transporting the tissue block from the tissue embedding module to a sectioning and slide creating module where one or more tissue sections are automatedly removed from the tissue block and placed onto one or more slides; automatedly transporting the one or more tissue sections on the one or more slides from the sectioning and slide creating module to a staining module where the one or more tissue sections on the one or more slides are stained; and automatedly transporting one or more stained tissue sections from the staining module to a cover-slipper module where a cover is placed onto the one or more stained tissue sections.

In some embodiments, the present disclosure relates to a method, further including automatedly transporting one or more covered tissue sections from the cover-slipper module to an imaging module where the one or more covered tissue sections are imaged. In some embodiments, the present disclosure relates to a method, further including fixing a tissue sample in formalin at a tissue processing module. In some embodiments, the present disclosure relates to a method, further including automatedly transporting the tissue sample fixed in formalin from the tissue processing module to the tissue embedding module where the tissue sample is embedded into an embedding material to prepare a tissue block. In some embodiments, the present disclosure relates to a method, further including receiving and processing the tissue sample at a tissue grossing module before transporting the tissue sample to the tissue processing module.

The present disclosure relates to a system including: a plurality of modules configured to: embed a tissue sample into an embedding material to prepare a tissue block; remove one or more tissue sections from the tissue block and place the one or more tissue sections onto one or more slides; stain the one or more tissue sections on the one or more slides; and place a cover onto the one or more stained tissue sections; and a processor communicatively coupled to each of the plurality of modules and being programmed to: instruct the plurality of modules to implement a processing protocol for the tissue sample, and track the tissue sample through the plurality of modules.

In some embodiments, the present disclosure relates to a system, wherein the processor is further configured to identify a tissue sample. In some embodiments, the present disclosure relates to a system, wherein the processor is further configured to assign a unique identifier to each of the one or more tissue sections. In some embodiments, the present disclosure relates to a system, wherein the processor is further configured to generate a processing status for each of the one or more tissue sections as each of the one or more tissue sections is passed through the plurality of modules. In some embodiments, the present disclosure relates to a system, wherein the processor is further configured provide analytics about a throughput of the system. In some embodiments, the present disclosure relates to a system, wherein the plurality of modules include: a tissue embedding module configured to embed the tissue sample into an embedding material to prepare a tissue block; a sectioning and slide creating module configured to remove the one or more tissue sections from the tissue block and place the one or more tissue sections onto the one or more slides; a staining module configured to stain the one or more tissue sections on the one or more slides; and a cover-slipper module configured to place the cover onto the one or more stained tissue sections. In some embodiments, the present disclosure relates to a system, further including an imaging module configured to image one or more covered tissue sections. In some embodiments, the present disclosure relates to a system, further including a tissue processing module configured to fix a tissue in formalin. In some embodiments, the present disclosure relates to a system, further including a tissue grossing module configured to receive and process a tissue sample before transporting the tissue sample to the tissue processing module.

BRIEF DESCRIPTION OF THE FIGURES

These and other characteristics of the present disclosure will be more fully understood by reference to the following detailed description in conjunction with the attached drawings, in which.

Figure 1:
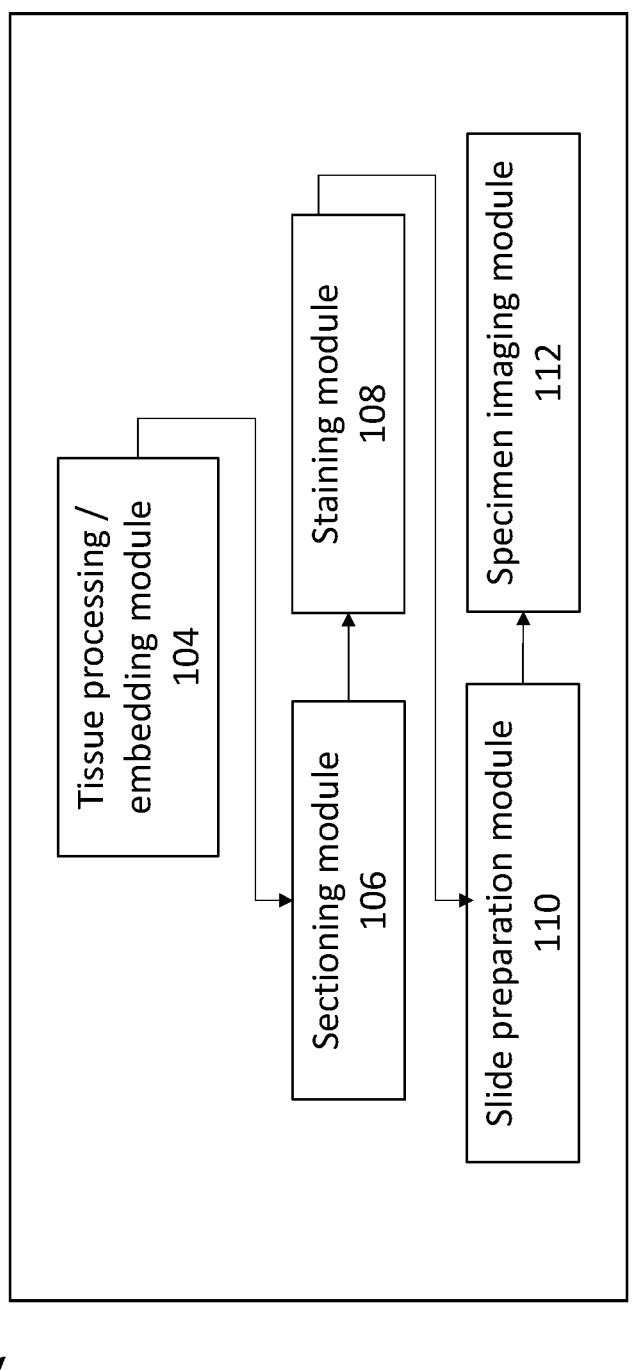
FIG. 1 shows an example flow chart of an integrated system, in accordance with the present disclosure.

While the above-identified drawings set forth presently disclosed embodiments, other embodiments are also contemplated, as noted in the discussion. The present disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

An illustrative embodiment of the present disclosure relates to an integrated pathology system that integrates various steps of tissue sample preparation. In this manner, the tissue samples can be prepared with minimum interactions from the user. Tissue processing in a pathology laboratory is a very labor intensive and highly skilled task. In some cases, pathology methods rely on skilled labor (e.g., histotechnologist) to perform mundane tasks, such as moving samples from one device to another. In certain transfer steps there are intermediate quality control steps. The proposed end-to-end automation of the present disclosure removes the reliance on skilled labor to perform the mundane tasks, such as tissue transfer, off-loads it to automation. With the addition of full automation throughout the pathology process, the skilled labor, such as a histotechnologist, can better utilize their talent on detailed and hard to implement quality control steps. For example, instead of handling transfers the histotechnologist can make sure the pathologists get the right kind of tissue they need for diagnostics.

In some embodiments, the present disclosure provides an integrated pathology system comprising: a tissue embedding module configured to embed the tissue sample into an embedding material to prepare a tissue block; a sectioning and slide creating module configured to remove one or more tissue sections from the tissue block and place the one or more tissue sections onto one or more slides; a staining module configured to stain the one or more tissue sections on the slides; a cover-slipper module configured to place a cover onto the one or more stained tissue sections; one or more transfer devices configured to integrate the modules; and a processor in communication with the modules for controlling one or more processes performed by the modules and the one or more transfer devices for controlling the integration of the modules.

In some embodiments, the integrated pathology system further includes an imaging module configured to image the one or more covered tissue sections. In some embodiments, the integrated pathology system further includes a tissue grossing module configured to receive and process a tissue sample.

In some embodiments, the automation can be designed to pick up tissue from a completed step by providing integration on to the existing tissue processing devices. For example, when the tissue is fixed in a tissue processor, the laboratory automation device can pick up the tissue from the tissue processor and place into an embedding automated embedder. Traditionally, systems such as the tissue processor and embedder systems are designed for humans to interact with. The present disclosure provides an automation system that will include elements to reduce and/or remove the reliance on human interaction between stages. For example, the system can include on or more robotic arms (robotic access devices) and other actuator and sensor systems to interact with each of pathology devices. In some embodiments these robotic arms may be provided by the original equipment manufacturer of the individual automation step. In some embodiments, the laboratory automation system of the present disclosure may have quality control systems such as optical imaging systems. The combination of this interlinking laboratory automation system would increase the speed and free up the skilled labor to attend more critical tasks in the lab.

Referring to FIG. 1, in some embodiments, multiple modules within a pathology system can be combined into a single integrated pathology system 100. The integrated pathology system 100 can include any combination of devices, systems, modules, etc. for creating a sample block, sectioning the sample block into samples, and preparing slides including the sectioned samples. In some embodiments, the integrated system 100 can include a tissue processing/embedding module 104, a sectioning module 106, a staining module 108, a slide preparation module 110, and a specimen imaging module 112. As shown in FIG. 1, the integrated system 100 can start with the tissue processing/ embedding 104 with one or more mechanisms to transfer a tissue specimen through the integrated system. From the tissue embedding module 104, the tissue block can be transferred, using one or more mechanisms, to the sectioning module 106 for sectioning. The sections can be transferred, by one or more mechanisms, from the sectioning module 106 to the staining module 108. Thereafter, the stained sections can be transferred, using one or more mechanisms, to the slide preparation module 110 to create a completed slide. Lastly, the slide can be provided to the specimen imaging module using one or more mechanisms. The one or more mechanisms connecting each of the modules can include any combination of mechanisms for transferring objects. For example, the one or more mechanisms can include any combination of conveyors, tapes, robotic arms, actuators, etc.

Figure 2:
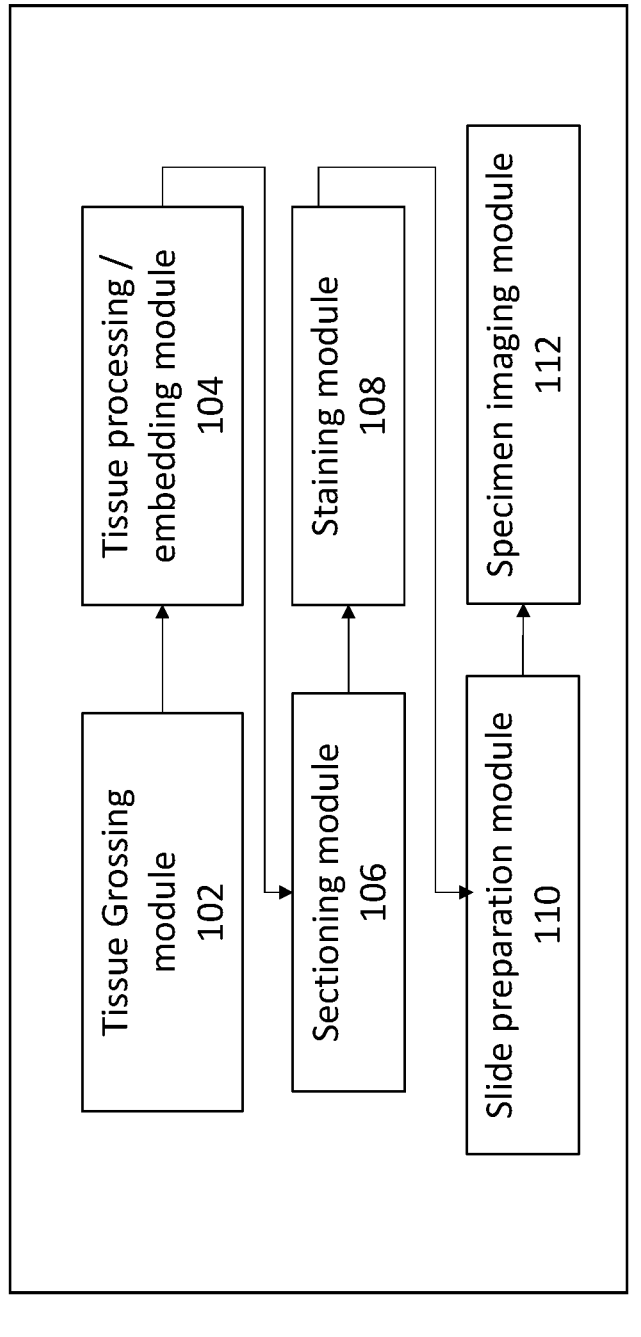
FIG. 2 shows another example flow chart of an integrated system, in accordance with the present disclosure.

In reference to FIG. 2, in some embodiments, an integrated pathology system of the present disclosure can further include a tissue grossing module 102.

In some embodiments, the present disclosure can include a fully integrated pathology system 100 within a single enclosure or multiple enclosures linked together, for example, linked by a conveyor. The integrated pathology system 100 can include any combination of the components for creating a sample tissue block, sectioning one or more sample sections from the tissue block, transferring the one or more sample sections to one or more slides, staining the one or more tissue sample sections on the one or more slides, and covering the one or more stained sample sections on one or more slides. In some embodiments, the system can further include an imaging module for recording digital images of the tissue sample. Additionally, the integrated pathology system 100 can include a combination of mechanisms to connect each of the components and transfer items between each of the components. For example, the combination of mechanisms can include any combination of a transfer medium such as an adhesive tape, conveyor, etc. and mechanical arms for lifting, placing, transferring, etc.

In some embodiments, the integrated pathology system 100 can be designed to receive previously processed tissue sample specimens, for example, specimens that have been processed through any combination of grossing methods known in the art. The type of specimen can include any combination of specimens known the art, for example, specimens that have been processed through examination and dissection of surgical specimens, along with preparation of sections from those tissues requiring processing. In some embodiments, such module can be a part of the integrated system.

In some embodiments, the integrated pathology system 100 can include a tissue processing module to fix the tissue.

In some embodiments, the integrated pathology system 100 can include a tissue embedding module 104 configured to fix and embed the grossed tissue sample into an embedding material to prepare a tissue block. The grossed tissue can be received into the tissue embedding module. For example, a histotech can place bits of tissue sample inside a labeled plastic cassette which can then be placed in special baskets and inserted into a tissue processor for fixing. In some embodiment, during the fixing step, the tissue can be treated in formalin to stop the decay of the tissue and preserve the integrity of the tissue. This step may use the established protocols/assays to treat the tissue for preservation. Once the tissue samples are fixed, the cassette can be transported to a tissue embedder so that the tissue sample can be embed with a suitable stabilizing material, for example paraffin wax. To perform the embedding process, the tissue embedder can remove the tissue pieces from the plastic cassette and places the tissue samples in a mold that is filled with liquid paraffin. The plastic cassette can also be placed on the mold to act as a lid such that it is submerged partially in the liquid paraffin. When the paraffin cools down and solidifies, the plastic cassette acts like a scaffolding, holding the tissue embedded in paraffin. Once the tissue sample has been embedded with the paraffin wax, it can be formed into a shape that is desirable for processing, for example, a block. The block shape can be sized and shaped for sectioning. The shape can be achieved using any combination of methods known in the art. For example, a mold can be filed with liquid paraffin wax and the tissue sample can be placed therein.

In some embodiments, the integrated pathology system 100 can include a sectioning and slide creating module configured to remove one or more tissue sections from the tissue block and place the one or more tissue sections onto one or more slides. The sectioning and slide creating module can include multiple elements for performing both the sectioning and slide creation. For sectioning, in some embodiments, the paraffin wax block with the tissue sample therein can be moved to a microtome which can cut a sectioned tissue sample from the block. Thereafter, the sectioned tissue sample can be provided to a slide assembly for slide creation. In some embodiments, the slide creation can include any combination of mechanisms for transferring the sectioned tissue sample to a slide.

In some embodiments, the integrated pathology system 100 can include a staining module 108 configured to stain the one or more sectioned tissue samples on the slides. Any combination of staining methods can be provided to stain the sectioned tissue sample on the slide. In most staining operations, a series of biochemical reagents can be applied to the tissue on glass slide. In some embodiments, these may be chemicals only as in H&E staining in other cases it may include tissue markers as in IHC. After staining the system 100 can transfer the stained tissue slides to a cover-slipper.

In some embodiments, the integrated pathology system 100 can include a cover-slipper or slide preparation module 110 configured to place a cover onto the one or more stained tissue sections. For example, once the sectioned tissue sample has been transferred to a slide, a slide cover is applied over the sectioned tissue sample on the slide to create a completed slide with the sectioned tissue sample therein. In some embodiments, the cover-slipper can be connected to the tissue staining module 108 with a robotic actuator working between the tissue staining module 108 and cover-slipper or slide preparation module 110 placed next to one another.

In some embodiments, the integrated pathology system 100 can include one or more transfer mechanisms configured to transport the block, sectioned samples, slides, etc. between each the modules, as is described in more detail below. For example, the one or more transfer mechanisms can be provided to transport cut tissue sample sections from the block from a microtome to a slide.

The one or more transfer mechanisms can include a combination of robotic arms, actuators, etc. for moving objects into, within, and out of the integrated pathology system 100. For example, the integrated pathology system 100 can include one or more transfer mechanisms for transferring objects between tissue fixing and embedder is a tissue cassette, a tissue specimen to the tissue embedding module to create a sample block, moving the sample block from the tissue embedding module to a sectioning module (e.g., a microtome) for sectioning, transferring one or more slides in place to receive sectioned tissue samples, transferring the slides for staining by the staining module, transferring the one or more slides to the cover-slipper module for slide creation, and transferring the one or more completed slides for removal from the integrated pathology system 100. In this chain all devices need to be modified to work with laboratory automation because currently they are all made to be operated by humans. In some embodiments, the modification to the pathology system 100 can include both hardware and software changes. The modifications may include changing access door/drawer designs, hardware negotiation devices such as sensors and actuators, software API functions for material exchange and access to such functions.

In some embodiments, one or more different types of pick and place robots or other types of automated transport devices may be utilized. Such transport devices can be configured to transfer different materials between the processing units, for example, tissue blocks, unstained tissue glass slides, etc. In some embodiments there could be a single transport system that adapts to different items that it carries. In other words, it could be payload agnostic. Additionally or alternatively, there may be provided one or more discrete transfer devices between each module.

Figure 3:
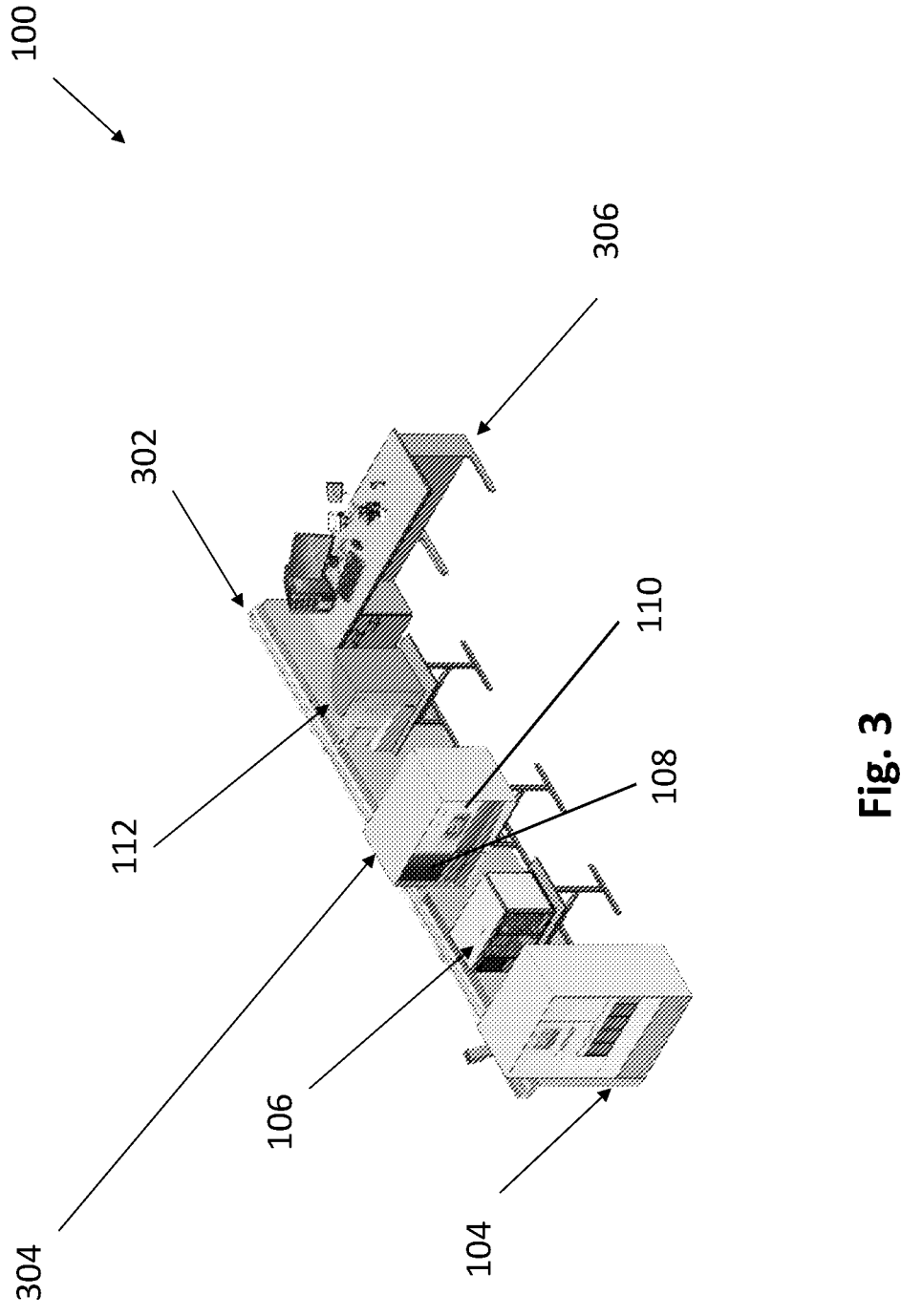
FIG. 3 illustrates an exemplary arrangement of a pathology system of the present disclosure.

FIG. 3 shows an exemplary embodiment of how the pathology system 100 can be configured in line, such that the individual modules are connected using a linear automation track or sample transport device 302. The positioning of the modules of the pathology system 100 along the linear automation track 302 from an initial input position of the pathology system 100 to a final output position of the pathology system 100, will now be discussed. In some embodiments, the tissue processing/embedding module 104 may be positioned immediately upstream the sectioning module 106 along the linear automation track 302.

In some embodiments, the sectioning module 106 may be positioned immediately downstream the tissue processing/ embedding module 104 along the linear automation track 302 and immediately upstream the tissue staining module 108 and the slide preparation module 110 along the linear automation track 302. In some embodiments, as depicted in FIG. 3, the staining module 108 and the slide preparation module 110 may be housed within a single hardware apparatus 304 containing instrumentation for both of the staining module 108 and the slide preparation module 110.

Still referring to FIG. 3, in some embodiments, the tissue staining module 108 and the slide preparation module 110 may be positioned immediately downstream the sectioning module 106 along the linear automation track 302 and immediately upstream the specimen imaging module 112 along the linear automation track 302. In some embodiments, the specimen imaging module 112 may be positioned immediately downstream the tissue staining module 108 and the slide preparation module 110 along the linear automation track 302 and immediately upstream a pathologist analysis station 306 along the linear automation track 302. In some embodiments, the pathologist analysis station 306 may be positioned immediately downstream the specimen imaging module 112 along the linear automation track 302. In some embodiments, the pathologist analysis station 306 may include one or more user interfaces, such as a personal computing device including a display screen, configured to display the images generated by the specimen imaging module 112. In some embodiments, the pathologist analysis station 306 may include one or more manual inspection instruments, such as microscopes, to allow a pathologist to manually visually inspect one or more slides generated by the pathology system 100, for instance.

In some embodiments, the arrangement and order of the various modules of the pathology system 100 along the linear automation track 302 are as depicted in FIG. 3, such that the workflow between the modules is maintained.

Still referring to FIG. 3, an exemplary process chain of the automated processes of the present disclosure will be discussed. The automated process may begin with formalin fixed tissue entering the tissue processing/embedding module 104. As discussed above, the tissue processing/embedding module 104 may generate tissue embedded in paraffin, held in place by plastic cassettes acting as scaffolding. The tissue processing/embedding module 104 may further form the embedded tissue samples in a desirable shape for processing, such as a block. The tissue processing/embedding module 104, may therefore, output the tissue embedded in paraffin on plastic cassettes or tissue block.

The tissue embedded in paraffin on plastic cassettes or tissue block output by the tissue processing/embedding module 104 may then be input into the sectioning module 106. The tissue embedded in paraffin on plastic cassettes or tissue block output may be transported from the tissue processing/embedding module 104 to the sectioning module 106 along the linear automation track 302, which may be a conveyor, for instance. One or more transfer mechanisms, such as robotic arms or actuators, may additionally assist in transporting the tissue embedded in paraffin on plastic cassettes or tissue block from the tissue processing/embedding module 104 to the sectioning module 106. The sectioning module 106 may remove one or more tissue sections from the tissue block, for instance, and place the one or more tissue sections onto one or more glass slides. The sectioning module 106 may, therefore, output the one or more tissue samples on the one or more glass slides.

The one or more tissue samples on the one or more glass slides output by the sectioning module 106 may then be input into the staining module 108 and the slide preparation module 110, which may be housed within the single hardware apparatus 304. The one or more tissue samples on the one or more glass slides may be transported from the sectioning module 106 to the staining module 108 and the slide preparation module 110 along the linear automation track 302. One or more transfer mechanisms, such as robotic arms or actuators, may additionally assist in transporting the one or more tissue samples on the one or more glass slides from the sectioning module 106 to the staining module 108 and the slide preparation module 110. The staining module 108 may stain the tissue samples on the glass slides, and the slide preparation module 110 may place a cover over the glass slides. The staining module 108 and the slide preparation module 110 may, therefore, together, output one or more covered glass slides including stained tissue samples.

The one or more covered glass slides including stained tissue samples output by the staining module 108 and the slide preparation module 110 may then be input into the imaging module 112. The one or more covered glass slides including stained tissue samples may be transported from the staining module 108 and the slide preparation module 110 to the imaging module 112 along the linear automation track 302. One or more transfer mechanisms, such as robotic arms or actuators, may additionally assist in transporting the one or more covered glass slides including stained tissue samples from the staining module 108 and the slide preparation module 110 to the imaging module 112. The imaging module 112 may generate a digital image of the one or more covered glass slides including stained tissue samples. The imaging module 112 may, therefore, output one or more digital images of the one or more covered glass slides including stained tissue samples.

The imaging module 112 may be communicatively coupled to one or more components, such as a personal computing device, of the pathologist analysis station 306.

Therefore, the digital images of the one or more covered glass slides including stained tissue samples output by the imaging module 112 may be input to, or uploaded to and displayed on, one or more components of the pathologist analysis station 306. A pathologist may inspect the digital images at the pathologist analysis station 306. Moreover, the one or more covered glass slides including stained tissue samples imaged by the imaging module 112 may be transported from the imaging module 112 to the pathologist analysis station 306 along the linear automation track 302. One or more transfer mechanisms, such as robotic arms or actuators, may additionally assist in transporting the one or more covered glass slides including stained tissue samples from the imaging module 112 to the pathologist analysis station 306. The pathologist may, therefore, manually visually inspect the one or more slides with one or more instruments of the pathologist analysis station 306, such as a microscope. One or more components of the pathologist analysis station 306, such as a personal computing device, may include processing components to automatedly perform tissue analysis and diagnostics based on the digital images of the one or more covered glass slides including stained tissue samples uploaded to the pathologist analysis station 306. At the pathologist analysis station, a pathologist may, also, perform manual tissue analysis and diagnostics based on inspection of the digital images of the one or more covered glass slides including stained tissue samples and/or the one or more covered glass slides including stained tissue samples, themselves. Therefore, the pathologist analysis station 306 may automatedly and/or manually output tissue analysis and diagnostics.

Such exemplary process, as described above, is summarized in table 1 below:

| Module | Input | Output |
| --- | --- | --- |
| Tissue processing/ embedding module | Formalin fixed tissue enters to the process | Tissue embedded in paraffin on plastic cassettes |
| Sectioning module | Tissue embedded in paraffin on plastic cassettes, tissue block | Tissue sectioned and sections placed on glass slides |
| Staining module/slide preparation module | Tissue on glass slides | Stained tissue on cover slipped glass slide |
| Imaging module | Stained tissue on cover slipped glass slide | Digital image of the slide |

Figure 4:
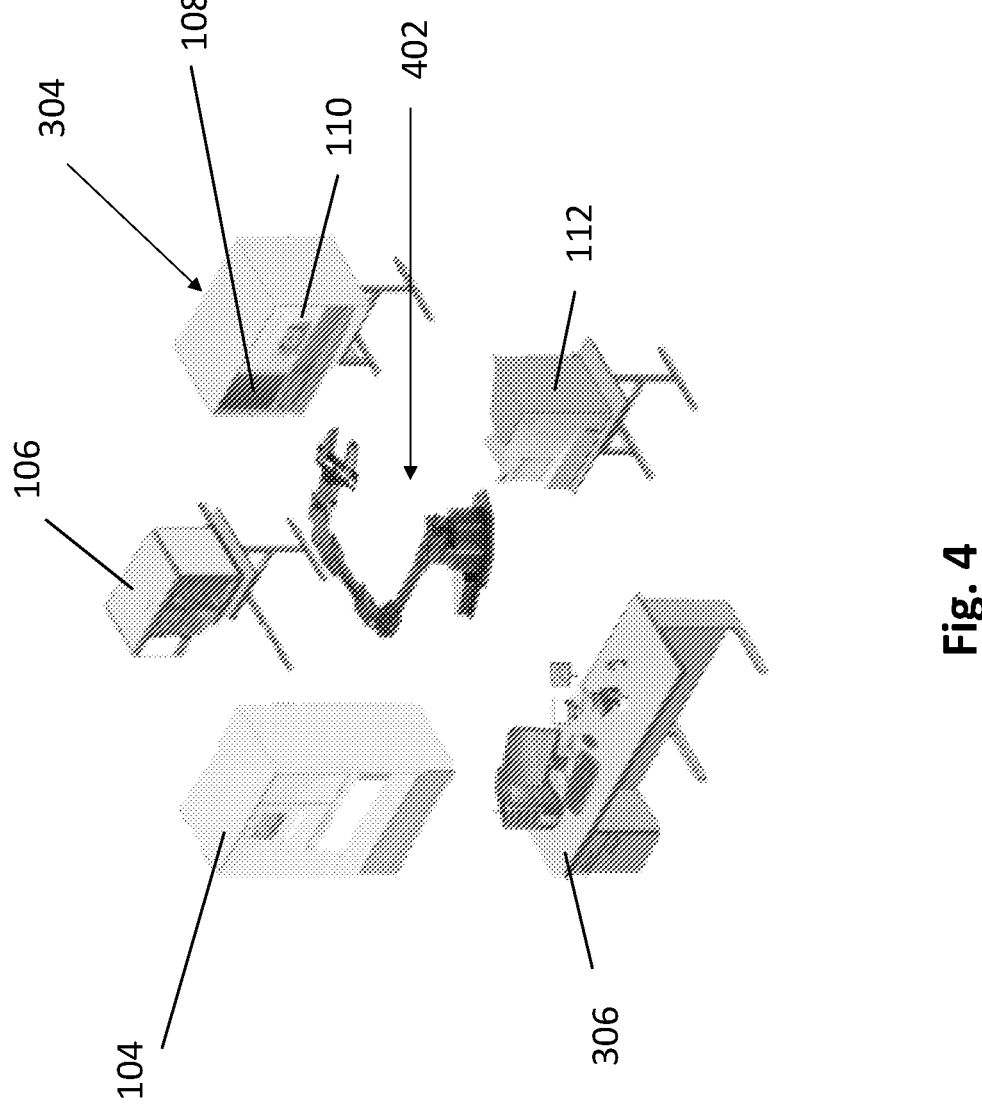
FIG. 4 illustrates an exemplary arrangement of individual modules a pathology system of the present disclosure.
Figure 4:
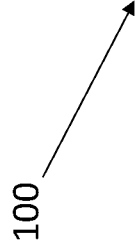

FIG. 4 illustrates an alternative arrangement of the individual modules of the pathology system 100, in a star shaped automation structure utilizing a radial pick and place robot 402 that can be configured to serve each processing module. More specifically, the tissue processing/embedding module 104, the sectioning module 106, the staining module 108 and the slide preparation module 110, which may be housed within the single hardware apparatus 304, the imaging module 112, and the pathologist analysis station 306 may be radially positioned around the radial pick and place robot 402. The various modules may be positioned around the radial pick and place robot 402 in a star-shaped structure.

The positioning of the modules of the pathology system 100 around the pick and place robot 402 will now be discussed. In some embodiments, the tissue processing/ embedding module 104 may be positioned adjacently between the sectioning module 106 and the pathologist analysis station 306, such that there are no intervening modules of the pathology system 100 positioned between the tissue processing/embedding module 104 and the sectioning module 106 or the pathologist analysis station 306. In some embodiments, the sectioning module 106 may be positioned adjacently between the tissue processing/embedding module 104 and the staining module 108 and the slide preparation module 110, which may be housed within the single hardware apparatus 304, such that there are no intervening modules of the pathology system 100 positioned between the sectioning module 106 and the tissue processing/embedding module 104 or the hardware apparatus 304 housing the staining module 108 and the slide preparation module 110. In some embodiments, the staining module 108 and the slide preparation module 110, which may be housed within the single hardware apparatus 304, may be positioned adjacently between the sectioning module 106 and the imaging module 112, such that there are no intervening modules of the pathology system 100 positioned between the hardware apparatus 304, housing the staining module 108 and the slide preparation module 110, and the sectioning module 106 or the imaging module 112. In some embodiments, the imaging module 112 may be positioned adjacently between the staining module 108 and the slide preparation module 110, which may be housed within the single hardware apparatus 304, and the pathologist analysis station 306, such that there are no intervening modules of the pathology system 100 positioned between the imaging module 112 and the staining module 108 and slide preparation module 110, housed within the hardware apparatus 304, or the pathologist analysis station 306. In some embodiments, the pathologist analysis station 306 may be positioned adjacently between the imaging module 112 and the tissue processing/embedding module 104, such that there are no intervening modules of the pathology system 100 positioned between the pathologist analysis station 306 and the imaging module 112 or the tissue processing/embedding module 104.

It should be appreciated, however, that the various modules of the pathology system 100, in some embodiments where the modules are arranged around the radial pick and place robot 402 in a star-shaped structure, may be positioned in any desirable order.

The pathology system 100 in the star-shaped automation structure, as depicted in FIG. 4, functions similarly to the pathology system 100 discussed with reference to FIGS. 1-3. That is, the general function of, outputs of, and relationships between the various modules of the pathology system 100 in the star-shaped automation structure may remain the same as previously discussed. However, unlike the linear automation structure depicted in and discussed with reference to FIG. 3, the modules of the pathology system 100 in the star-shaped automation structure, as depicted in FIG. 4, are not linked by the linear automation track 302 (FIG. 3). Instead, the pick and place robot 402 may pick up an item, such as the output of a first module, at the first module, and place the item into or on a second module, such that the item is the input for the second module. Merely as an example, the pick and place robot 402 may pick up the tissue embedded in paraffin on plastic cassettes or tissue block, output by the tissue processing/embedding module 104, at or from the tissue processing/embedding module 104. The pick and place robot 402 may then place the tissue embedded in paraffin on plastic cassettes or tissue block at or in the sectioning module 106.

In some embodiments, each of the modules of the pathology system 100 in the star-shaped automation structure, as depicted in FIG. 4, may be linked by one or more automation transport devices, such as actuators, belts, and/or conveyors (not depicted). In such embodiments, the pick and place robot 402 may pick up an item, such as the output of a first module, at the first module, and place the item onto the automation transport device. The automation transport device may then transport the item to a second module, such that the item is the input for the second module. Merely as an example, the pick and place robot 402 may pick up the tissue embedded in paraffin on plastic cassettes or tissue block, output by the tissue processing/embedding module 104, at or from the tissue processing/embedding module 104. The pick and place robot 402 may then place the tissue embedded in paraffin on plastic cassettes or tissue block on an automation transport device coupled to the sectioning module 106. The automation transport device may then transport the tissue embedded in paraffin on plastic cassettes or tissue block to the sectioning module 106.

Figure 5:
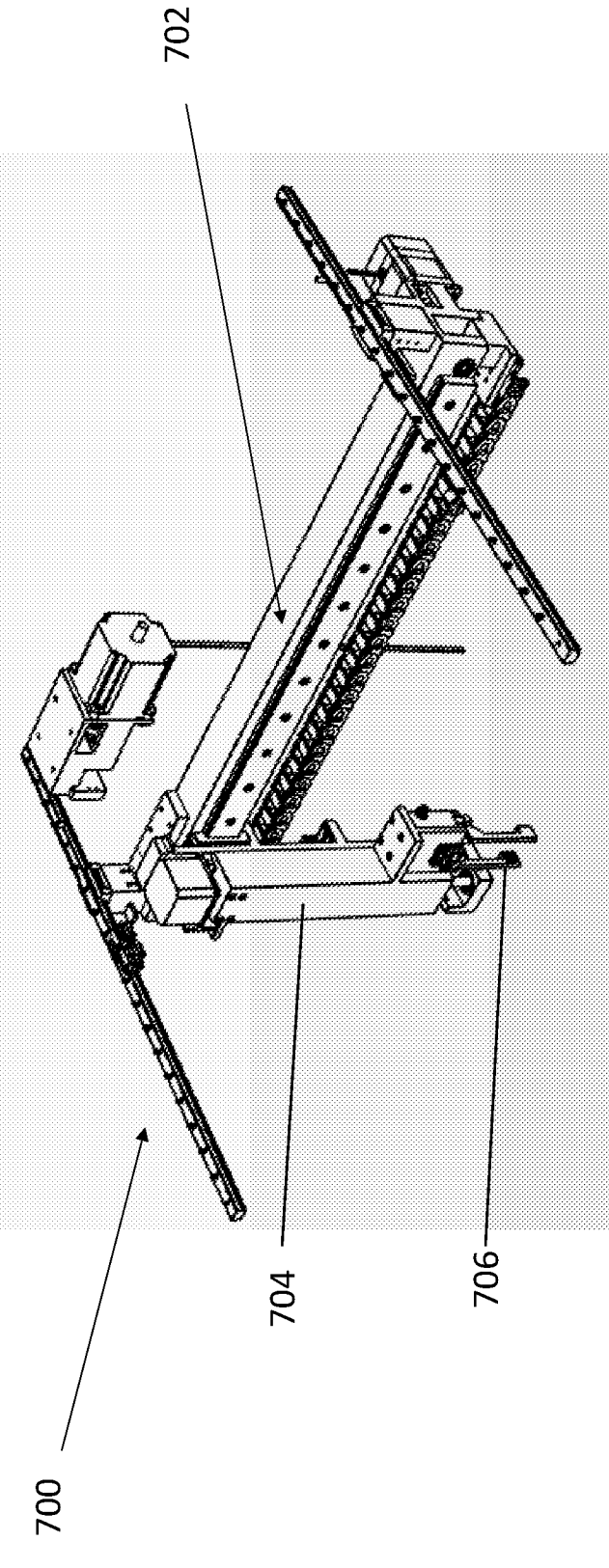
FIG. 5 illustrates an embodiment of a material transport unit that can be used in connection with the pathology systems of the present disclosure.

FIG. 5 illustrates an embodiment of a material transport unit 700 that can be used in connection with the pathology systems 100 of the present disclosure. The material transport unit 700 may include a three-axis robotic arm system 702, including at least one moveable robotic arm 704. The robotic arm 704 may include grippers 706 at an end of the robotic arm 704. The grippers 706 may be configured to pick up one or more items, such as by non-limiting example, a tissue sample block, from one or more modules of the pathology system 100 (FIGS. 1-4). Similarly, the grippers 706 may be configured to place one or more items, such as by non-limiting example, a tissue block sample, into one or more modules of the pathology system 100 (FIGS. 1-4) and/or on an automation transport device of the pathology system 100 (FIGS. 1-4).

Figure 6:
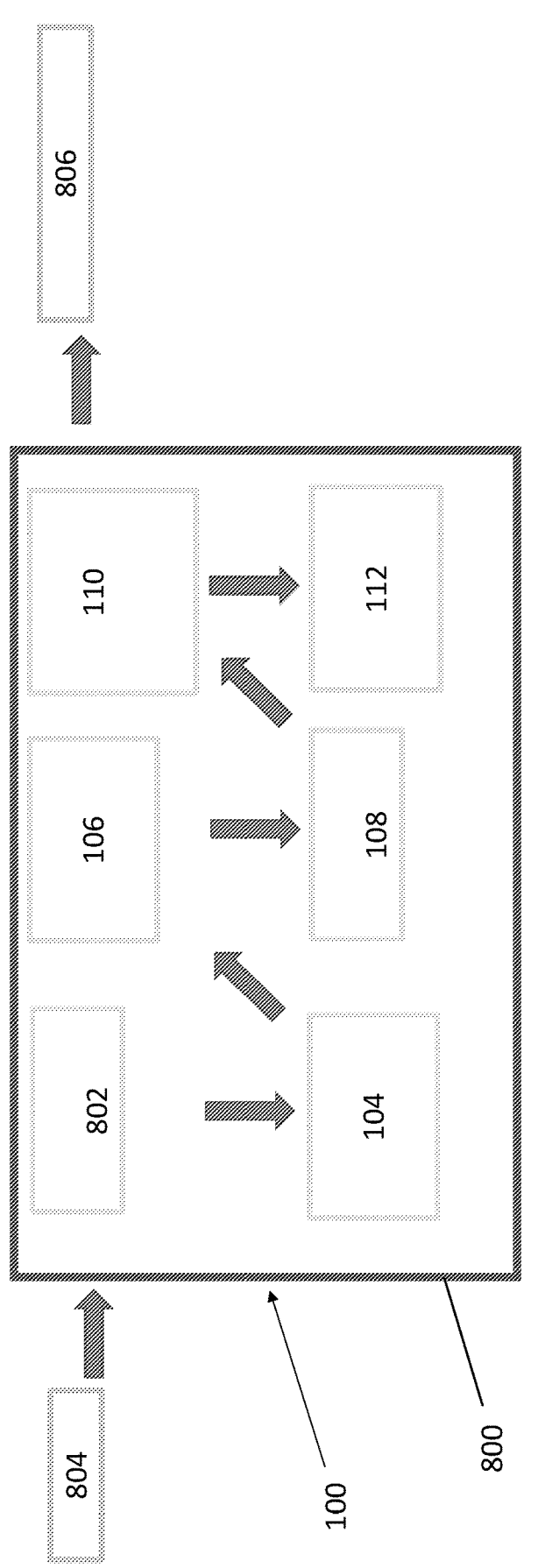
FIG. 6 illustrates an exemplary embodiment of a pathology system of the present disclosure.

FIG. 6 illustrates some embodiments of the pathology system 100, where the individual modules are arranged in a common housing 800, that is integrated into a single overall unit. A tissue processing module 802 to fix the tissue, the tissue embedding module 104, the sectioning module 106, the staining module 108, the slide preparation module 110, and the specimen imaging module 112 may be arranged within the common housing 800. In some embodiments, such system can receive the tissue as an input 804 and an output 806 could include tissue block, unstained tissue on glass slide, stained tissue on glass slide and digital whole slide image, similar to the above-described systems.

In some embodiments, the pathology systems 100 of the present disclosure is configured to integrate and standardize various processing steps end to end. Such systems can increase the efficiency of the lab personnel who is moving material from one device to another today. Such systems can also provide increased sample chain of custody, quantified sample integrity checks, and quality control check points, as well as images, videos, measured attributes (tissue volume, tissue area) to the healthcare professionals.

In some embodiments, the pathology system 100 can include multiple modules and/or transferring mechanisms for each process step, for example, there can be two section modules, two stainer modules, three slide modules, etc.

In some embodiments, the integrated pathology system 100 can include one or more processors in communication with the modules for controlling one or more operations performed by the modules and the one or more transfer devices for controlling the overall integration of the modules. The one or more processors can be responsible for tracking objects (i.e., blocks, sectioned samples, slides, etc.) within the integrated pathology system 100 and the operation of each of the modules within the integrated pathology system 100. The combination of the object tracking and control over the modules enables one or more processors within the integrated pathology system 100 to precisely coordinate the pathology methodology from received sample specimen to completed slides containing sectioned samples from the specimen. The processing units may be connected to various types of hardware controllers, such as PLCs or motor controllers. In some embodiments, the processing unit can communicate with the electromechanical hardware directly. The processing unit can use CAN, serial connections, EtherCat, GigE or ethernet protocols to directly communicate with the electromechanical hardware.

In some embodiments, the system connects to a LIMS system, for example, to obtain protocol for sample preparation or communicating updates on the progress of the samples, as described in co-pending commonly-owned applications, incorporated herein by reference in their entireties. In some embodiments, the one or more automated modules of the system 100 can communicate with one another. For example, a confirmation may be sent that a process is over and the material is moving to the next stage. In some embodiments, the images from the imaging module may be communicated to a database, such as LIMS.

In some embodiments, the integrated pathology system 100 can include one or more imaging units configured to provide imaging throughout the integrated pathology system 100. The imaging can be used by the one or more processors to track objects within the integrated pathology system 100 as well as monitor for proper operation of the various modules and quality control. For example, the one or more imaging units can record an image the one or more covered tissue sections to determine if the slide is properly assembled and/or the tissue sample is of a particular quality. Traditionally, the tissue quality can be checked by a histotech on the current workflow between the processing stations. In some embodiments, this task can be handed over the laboratory automation to make sure the quality is still maintained. These quality checks may include optical systems in the visible, UV, IR or X-ray range. In some embodiments there may be mechanical means to check paraffin integrity, or block shape for conformity to the next device. The data collected at each step would be compared to the image of the tissue processed in the previous steps algorithmically to ensure tissue integrity and tissue tracking. Similarly, barcodes would be checked to ensure tissue tracking.

In operation, the integrated pathology system 100 can be used as an all-in-one pathology processing device. Initially, a grossed specimen can be received within the integrated pathology system 100. Thereafter, the grossed specimen is provided to a tissue embedding module configured to embed the tissue sample into an embedding material to prepare a tissue block. After the tissue block is formed, the tissue block is transferred to a sectioning and slide creating module configured to remove one or more tissue sections from the tissue block and place the one or more tissue sections onto one or more slides. Once a tissue section has been transferred to a slide, the slide can be transferred to a staining module configured to stain the one or more tissue sections on the slide. After staining is complete, the stained tissue sections on the slide can be provided to a cover-slipper module configured to place a cover onto the one or more stained tissue sections. The completed slides can be imaged by the imaging module and/or examined manually by a pathologist.

Figure 7:
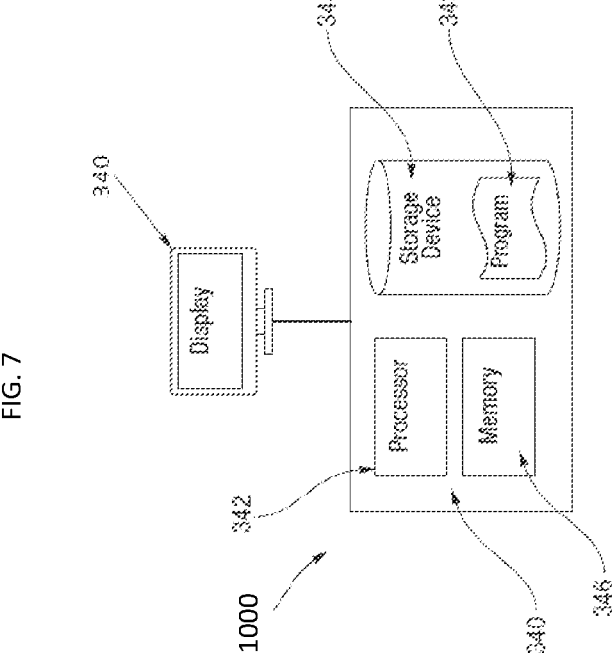
FIG. 7 illustrates an exemplary computer system suitable for use in connection with the systems and methods of the present disclosure.

In reference to FIG. 7, in some embodiments, the integrated pathology system of the present disclosure and/or individual components can be controlled using a computer system 1000, in particular, a processor 342, that is programed to perform one or more steps of the methods described above. In some embodiments, the computer system 1000 may comprise information exchange system to communicate with the modules. FIG. 7 shows, by way of example, a diagram of a typical processing architecture for the computer system 1000, which may be used in connection with the methods and systems of the present disclosure. A computer processing device 340 can be coupled to display 341 for graphical output. Processor 342 can be a computer processor 342 capable of executing software. Typical examples can be computer processors (such as Intel® or AMD® processors), ASICs, microprocessors, and the like. Processor 342 can be coupled to memory 346, which can be typically a volatile RAM memory for storing instructions and data while processor 342 executes. Processor 342 may also be coupled to storage device 348, which can be a non-volatile storage medium, such as a hard drive, FLASH drive, tape drive, DVDROM, or similar device. Although not shown, computer processing device 340 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 340. Processor 342 may also be coupled to other types of computer-readable media, including, but not limited to, an electronic, optical, magnetic, or other storage or transmission device capable of providing a processor, such as the processor 342, with computer-readable instructions. Various other forms of computer-readable media can transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Program 349 can be a computer program or computer readable code containing instructions and/or data and can be stored on storage device 348. The instructions may comprise code from any computer-programming language, including, for example, C, C++, C#, Visual Basic, Java, Python, Perl, and JavaScript. In a typical scenario, processor 342 may load some or all of the instructions and/or data of program 349 into memory 346 for execution. Program 349 can be any computer program or process including, but not limited to web browser, browser application, address registration process, application, or any other computer application or process. Program 349 may include various instructions and subroutines, which, when loaded into memory 346 and executed by processor 342 cause processor 342 to perform various operations, some or all of which may effectuate the methods for managing medical care disclosed herein. The program 349 may be stored on any type of non-transitory computer readable medium, such as, without limitation, hard drive, removable drive, CD, DVD or any other type of computer-readable media.

Figure 9:
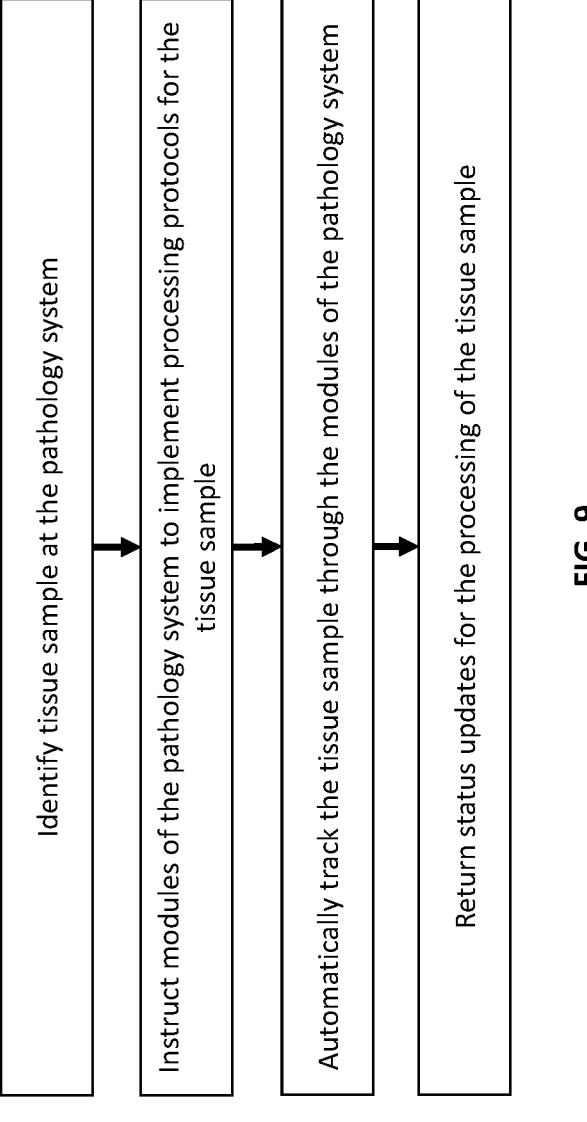
FIG. 9 illustrates a flow chart illustrating aspects of at least one embodiment of the automated steps of a computer system of the present disclosure.

Referring now to FIG. 9, in some embodiments, the computer system 1000 may be configured to identify a tissue sample at the pathology system 100. For instance, the computer system 1000 may assign an identifier to a tissue sample provided to the tissue processing/embedding module 104. In some embodiments, the computer system 1000 may additionally instruct each of the modules of the pathology system 100 such that each of the modules, respectively, follow processing protocols and complete their designated workflow task related to the tissue sample. In some embodiments, the computer system 1000 may automatically track the tissue sample through the various modules of the pathology system 100. For instance, the sectioning module 106 may generate multiple tissue sections from the same tissue block generated by the tissue processing/embedding module 104. Each of the multiple tissue sections may be assigned a unique identifier by the computer system 1000. The unique identifier assigned to each of the multiple tissue sections may further indicate that each of the multiple tissue sections originated from a common tissue block. As each of the multiple tissue sections are stained and placed on a slide, the slide associated with a particular tissue section may assume the unique identifier of the particular tissue section or be assigned a new identifier. The computer system 1000 may track each of the multiple tissue sections and slides through the modules of the pathology system 100. The computer system 1000 may generate a sample processing status for each of the multiple tissue sections and slides as each tissue section/slide is passed through the modules of the pathology system 100. Based on the tracking, the computer system 1000 may provide analytics about the throughput of the pathology system 100.

In some embodiments, the computer system 1000 may be communicatively coupled to a Lab Information Management System (LIMS). The LIMS may have tissue sample data for each tissue sample. Thus, the computer system 1000 may identify the tissue sample and connect to the LIMS to query processing protocols for the tissue sample, such as processing protocols, handling protocols, tracking protocols, operation and section ordering, among other protocols for any portions of the processing of a tissue sample by the pathology system 100. Upon receiving the processing protocols from the LIMS, the computer system 1000 may instruct the various modules of the pathology system 100 according to the processing protocols. The computer system 1000 may connect to the LIMS to provide updates on the status of the tissue samples, such as, for example, a current progress towards completed processing and imaging of the tissue sample according to the processing protocols, a processing report (for example, as a portable document format (PDF) or other suitable document format) and preliminary tissue on slide images. The LIMS may store the processing reports for the tissue sample. Additionally, the tissue processing system may connect to a device management server or system to upload operational, maintenance, consumable and usage data to track the operations of the tissue processing system FIGS. 8A-8D illustrate an exemplary embodiment of a sectioning module 106 to enable tissue sample processing from block to slide. The system 500 can be designed to include a first section for cutting samples from the tissue blocks. In some embodiments, the first section, for example as shown in FIG. 8B, can include a block handler, at least one microtome 504, a transfer medium 506 (e.g., a tape), a hydration chamber 508, and a block tray 510. The block handler, the at least one microtome 504, the transfer medium 506 (e.g., a tape), the hydration chamber 508, and the block tray can be designed to operate together to organize, face, hydrate, section biological samples from tissue blocks and transfer the tissue sections to slides using any combination of systems and methods.

In some embodiments, the system 500 can include a transfer medium 506 (e.g., a tape) to receive the sample slices taken from the tissue block, for example, by a sectioning microtome 504. The transfer medium 506 can include any combination of materials or surfaces that are able to receive a sectioned sample from a microtome 504 and transport the sectioned sample to another location. In some embodiments, the transfer medium 506 can include at least one adhesive surface capable of removing, receiving, and/or transporting a sectioned sample from a microtome 504 after it has been cut from the tissue block. For example, the transfer medium 506 can include any combination of tapes, such as for example, a tape roll, windowed tape, etc. The transfer medium 506 can include or otherwise be a part of a larger mechanism for transferring a sectioned sample. For example, the transfer medium can be an adhesive tape wrapped over a combination of pulleys, wheels, spools, conveyers, etc. designed to enable the transfer medium 506 move a sectioned sample thereon from one location to another. Any other combination of transfer mediums can be used without departing from the present disclosure. For example, the transfer medium 506 can be a belt with ridges, dips, etc. designed to grasp and/or hold the sectioned samples.

In some embodiments, the transfer medium 506 can transfer sectioned samples from its surface to a shifting assembly 522 for transferring the sample onto a slide. The shifting assembly 522 can be designed to remove the samples adhered to the transfer medium 506 and place the samples on one or more slides. In some embodiments, transferring by the shifting assembly 522 can include separating the actual tissue sample material to isolate the sample from the non-sample material. The shifting assembly 522 can use any combination of systems or methods to separate an entirety or a portion of the biological sample for the surrounding the paraffin material such that only the biological sample material is transferred to the slides. For example, the shifting assembly 522 can core out a portion of the biological sample to be removed from the transfer medium 506. In some embodiments, the non-sample material (e.g., paraffin material) can remain on the transfer medium 506 to be discarded with the used transfer medium.

Figure 8A:
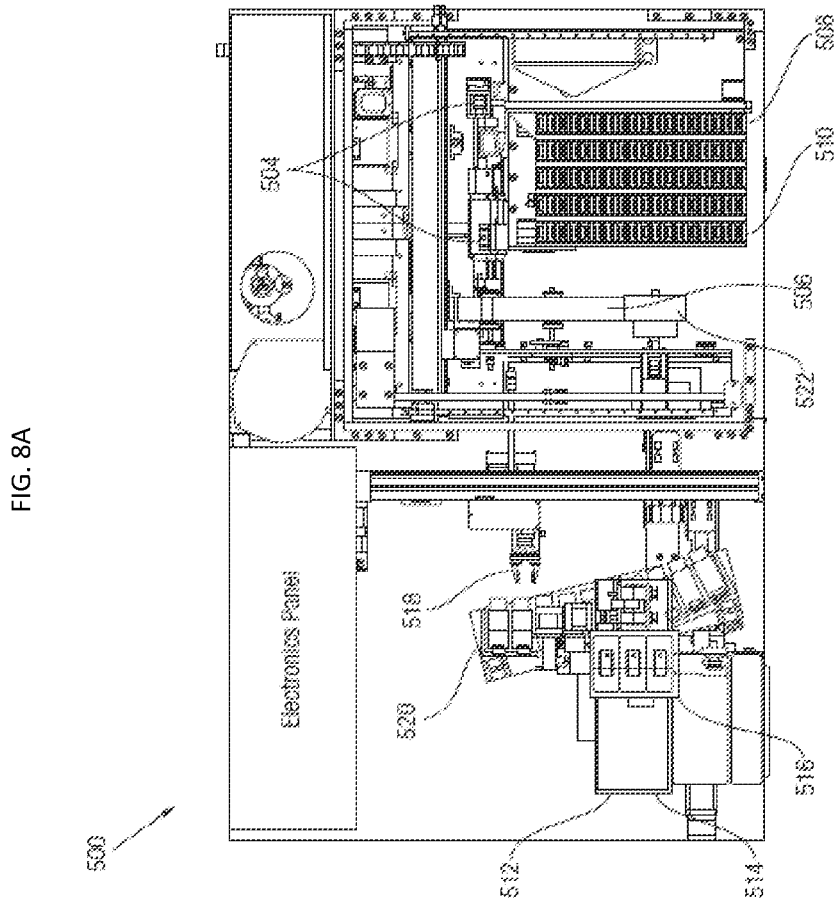
FIGS. 8A-8D illustrate an exemplary embodiment of a sectioning module in accordance with some embodiments, of the present disclosure.
Figure 8B:
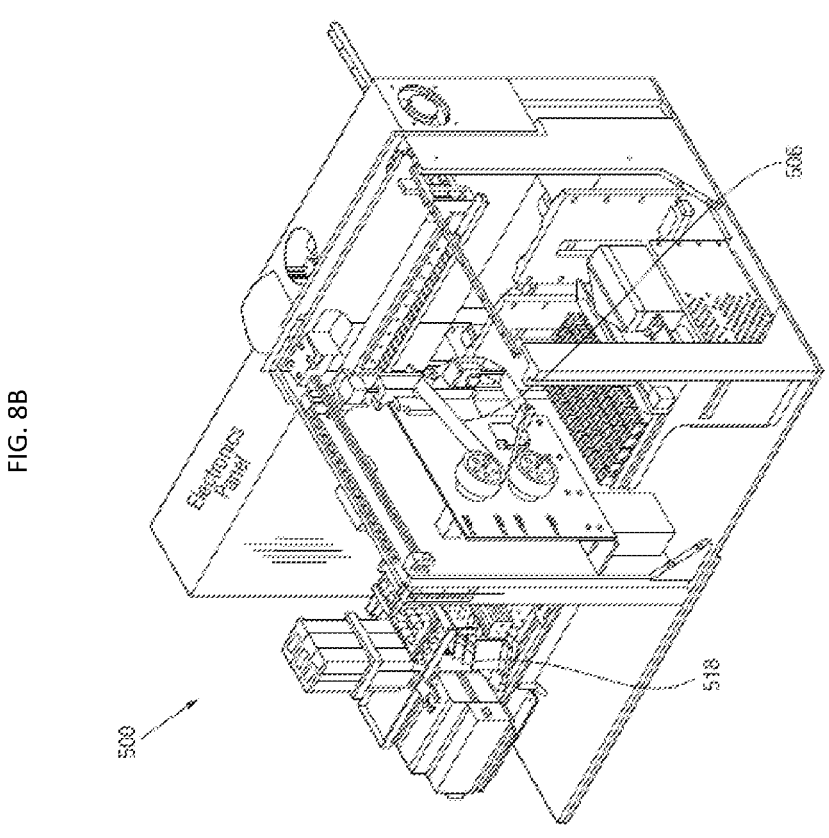
Figure 8C:
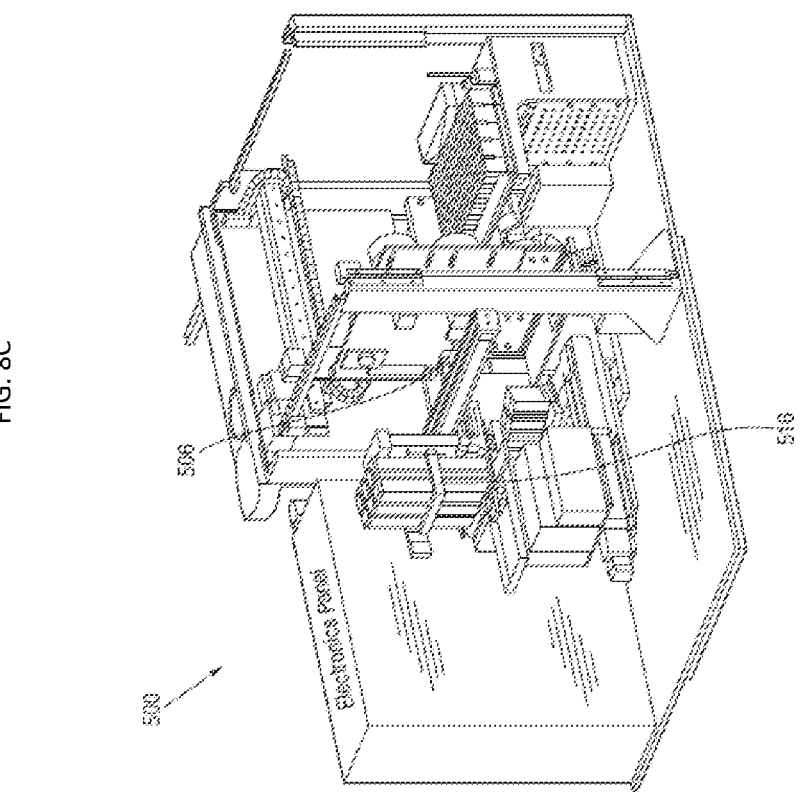

Continuing with FIGS. 8A-8C, the system 500 can also include a second section, for example as shown in FIG. 8C, having a combination of mechanisms to prepare and provide a slide to receive a biological sample cut from the block (e.g., in the first section) from the transfer medium 506 (e.g., a tape) and processing the slide for analysis. In some embodiments, the combination of mechanisms for processing the slide in the second section can include a slide adhesive coater 512, a slide printer 514, slide input racks 516, a slide singulator 518, and slide output racks 520. This combination of mechanisms can work together to prepare the slide to receive a sample, secure the sample on the slide, and deliver/organize the slide with the sample to a rack for later use. In some embodiments, initial blank slides can be provided within a storage rack of a slide assembly for pre-processing. For example, the slide assembly can include one or more slide input racks 516 for storing a plurality of blank slides. The slide assembly can store and organize slide in a large capacity, for example, 200 slides.

In some embodiments, the slide singulator 518 can be designed to grab a slide from a stack of slides within the input racks 116. The slide singulator 518 can includes any combination of mechanisms capable of picking up and transporting the slides. For example, the slide singulator 518 can be an actuating mechanical arm, a gantry, etc. Before being processed, the slide singulator 518 can provide slides for a quality control step. During the quality control step, an analysis can be performed on the slide to ensure the slide is suitable to receive a sample. For example, the quality control can include the slide singulator 518 transporting the slide in view of a camera to provide image data for image processing to identify any potential issues with the slide, check an orientation of a slide, a condition of a slide, etc. If the slide fails the quality control inspection it can be discarded, if it passes, it can be transported within the system 500 to be prepped to receive a sample. In some embodiments, the slide can be transported to the slide printer 514 to receive an identification information printed thereon. For example, information about a sample type, sample origin, sample date, etc. can be printed on the slide. The identification information can include any combination of machine readable and human readable code or text such that the slides and the content thereof can be properly identified and tracked. For example, the slide printer 514 can print a machine-readable barcode on the slide to identify the slide number, batch, contents, etc.

In some embodiments, the slide can be transported to the slide adhesive coater 512 to be coated by an adhesive material. For example, the slide adhesive coater 512 can spray an ultraviolet (UV) activated adhesive on the slide, apply an UV activated adhesive tape, or any combination of adhesive systems or methods. In some embodiments, the adhesive can be applied in multiple layers. The numerous layers can be applied such that the slide receives a uniform coating of the adhesive to ensure clear viewing through the slide layer. In some embodiments, the slide can be inserted into the slide input racks 516 already preprocessed or partially pre-processed.

Once the slide has been processed by the slide printer 514 and the slide adhesive coater 512, the slide can be transported to the transfer medium to receive a sample from the transfer medium 506. For example, the slide can be transported to the shifting assembly 522 to receive sectioned tissue block samples from transfer medium 506 (e.g., a tape mechanism). In some embodiments, prior to transferring the sample to a slide, the shifting assembly 522 can include one or more cameras to perform image processing to determine whether samples of the transfer medium 506 are suitable for adhesion to a slide. For example, the image processing can inspect the sample to determine whether it is suitable for placement on a slide. If it is not suitable the sample can be discarded and the transfer medium 506 can be advanced to the next sample. When a sample is suitable for placement on a slide, it can be applied to the slide. In some embodiments, the image processing can inspect the sample after it has been adhered to the slide to determine whether or not the placement of the sample is of sufficient quality. For example, image processing can inspect the slide to determine whether the sample is cleanly adhered to slide, no bubbling, tearing, paraffin remanence, etc. If a slide is not suitable, the slide can be discarded instead of being placed in the slide output racks 520.

In some embodiments, the completed slides can be transported, by the singulator 518, to be stored in the slide output racks 520. The slides can be stored in the slide output racks 520 in a predetermined order and/or organizational method such that the next steps in which the slides will be used can easily locate and remove the slides.

Figure 8D:
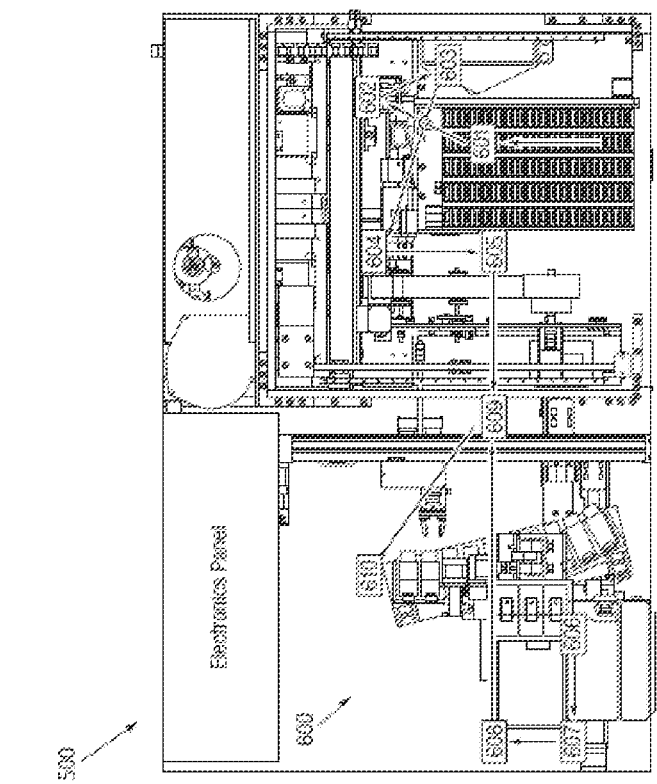

FIG. 8D shows the process flow of a block to slide steps used in the system 500 provided in FIGS. 8A-8C. At step 601, the sample tissue blocks can be loaded in the system 500. For example, one or more tissue blocks, with tissue samples embedded within a paraffin block, can be loaded into trays 510 and placed within the system 500. At step 602, one of the sample tissue blocks can be moved from the tray 510 to a microtome 504 for facing. For example, a tissue block can be transported by a handler and placed within a chuck of a facing microtome 504 to be faced. At step 603, the faced tissue block can be moved to the hydration chamber 508 to be hydrated and cooled. For example, a tissue block can be transported by a handler and placed within the hydration chamber 508 for a predetermined period of time. After sufficient hydration has been provided, at step 604, the tissue block can be moved to a microtome 504 for sectioning. For example, a tissue block can be transported by a handler and placed within a chuck of a sectioning microtome 504 to be polished and sectioned. The block can be provided to the same microtome that performed the facing or a different microtome 504. Thereafter, each sectioned sample can be transferred to the transfer medium 506. At step 605 the sectioned samples on the transfer medium 506 can be transferred to a slide.

Simultaneous to or subsequent to steps 601-605, steps 606-608 can be performed to prepare one or more slides for combining with the sectioned samples from the tissue block. At step 606, a microscope slide can be selected and obtained from a stack of new slides. For example, the slide singulator 518 can select and pull a slide from a stack of slides stored within a rack 516 of blank slides. At step 607, identifying information can be printed on the selected slide. For example, the slide can be placed within the slide printer 514 to have a machine-readable barcode printed thereon. At step 608, an adhesive material can be coated on the selected slide. For example, the slide can be placed within the slide adhesive coater 512 to have a UV activated adhesive sprayed thereon. At step 609, the tissue sample can be transferred from the transfer medium 506 to the UV adhesive coated slide. Additionally, during step 609, the slide can be imaged for onboard diagnostics, quality control, and sample tracking. For example, one or more cameras can be used to capture image data to be processed by an image processor for predetermined quality thresholds. Once the slide has passed the quality control, at step 610 the completed tissue slide can be moved to the output rack 520 to be stored for future analysis.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the disclosure. It is intended that the present disclosure be limited only to the extent required by the appended claims and the applicable rules of law.

It is also to be understood that the following claims are to cover all generic and specific features of the disclosure described herein, and all statements of the scope of the disclosure which, as a matter of language, might be said to fall therebetween.

What is claimed is:

1. An integrated pathology system comprising:
   a tissue embedding module configured to embed a tissue sample into an embedding material to prepare a tissue block;
   a sectioning and slide creating module configured to remove one or more tissue sections from the tissue block and place the one or more tissue sections onto one or more slides;
   a staining module configured to stain the one or more tissue sections on the one or more slides;
   a cover-slipper module configured to place a cover onto the one or more stained tissue sections;
   one or more transfer devices configured to integrate the modules, wherein:
   the one or more transfer devices comprise a pick-and-place robot; and
   the modules are positioned radially around the pick-and-place robot; and
   a processor in communication with the modules and being programmed to control one or more processes performed by the modules and the one or more transfer devices for controlling the integration of the modules.

2. The integrated pathology system of claim 1 further comprising an imaging module configured to image the one or more covered tissue sections.

3. The integrated pathology system of claim 1 further comprising a tissue processing module or station configured to fix a tissue in formalin.

4. The integrated pathology system of claim 1 further comprising a tissue grossing module or station configured to receive and process a tissue sample before transporting the tissue sample to the tissue embedding module.

5. The integrated pathology system of claim 1 further comprising systems to check and verify tissue quality and enable tissue tracking throughout the system.

6. The integrated pathology system of claim 1, wherein the processor is further programmed track the tissue sample through the one or more processes.

7. A method, comprising:

automatedly embedding a tissue sample into an embedding material to prepare a tissue block at a tissue embedding module;

automatedly transporting the tissue block from the tissue embedding module to a sectioning and slide creating module where one or more tissue sections are automatedly removed from the tissue block and placed onto one or more slides;

automatedly transporting the one or more tissue sections on the one or more slides from the sectioning and slide creating module to a staining module where the one or more tissue sections on the one or more slides are stained; and automatedly transporting one or more stained tissue sections from the staining module to a cover-slipper module where a cover is placed onto the one or more stained tissue sections, wherein:

the automatedly transporting comprises moving, with a pick-and-place robot, an output from at least one of the tissue embedding module, the sectioning and slide creating module, or the staining module, to at least one of the sectioning and slide creating module, the staining module, or the cover-slipper module; and the tissue embedding module, the sectioning and slide creating module, the staining module, and the cover-slipper module are positioned radially around the pick-and-place robot.

8. The method of claim 7, further comprising automatedly transporting one or more covered tissue sections from the cover-slipper module to an imaging module where the one or more covered tissue sections are imaged.

9. The method of claim 7, further comprising fixing a tissue sample in formalin at a tissue processing module.

10. The method of claim 9, further comprising automatedly transporting the tissue sample fixed in formalin from the tissue processing module to the tissue embedding module where the tissue sample is embedded into an embedding material to prepare a tissue block.

11. The method of claim 9, further comprising receiving and processing the tissue sample at a tissue grossing module before transporting the tissue sample to the tissue processing module.

12. A system comprising:

a plurality of modules configured to:

embed a tissue sample into an embedding material to prepare a tissue block;

remove one or more tissue sections from the tissue block and place the one or more tissue sections onto one or more slides;

stain the one or more tissue sections on the one or more slides; and place a cover onto the one or more stained tissue sections;

a pick-and-place robot configured to integrate the plurality of modules, wherein the plurality of modules are positioned radially around the pick-and-place robot in a star-shaped structure; and a processor communicatively coupled to each of the plurality of modules and being programmed to:

instruct the plurality of modules to implement a processing protocol for the tissue sample; and track the tissue sample through the plurality of modules.

13. The system of claim 12, wherein the processor is further configured to identify a tissue sample.

14. The system of claim 12, wherein the processor is further configured to assign a unique identifier to each of the one or more tissue sections.

15. The system of claim 12, wherein the processor is further configured to generate a processing status for each of the one or more tissue sections as each of the one or more tissue sections is passed through the plurality of modules.

16. The system of claim 12, wherein the processor is further configured provide analytics about a throughput of the system.

17. The system of claim 12, wherein the plurality of modules comprise:

a tissue embedding module configured to embed the tissue sample into an embedding material to prepare a tissue block;

a sectioning and slide creating module configured to remove the one or more tissue sections from the tissue block and place the one or more tissue sections onto the one or more slides;

a staining module configured to stain the one or more tissue sections on the one or more slides; and a cover-slipper module configured to place the cover onto the one or more stained tissue sections.

18. The system of claim 12, further comprising an imaging module configured to image one or more covered tissue sections.

19. The system of claim 12, further comprising a tissue processing module configured to fix a tissue in formalin.

20. The system of claim 19, further comprising a tissue grossing module configured to receive and process a tissue sample before transporting the tissue sample to the tissue processing module.

21. The system of claim 12, wherein the processor is communicatively coupled to the pick-and-place robot and further programmed to instruct the pick-and-place robot to move an output from at least one of the plurality of modules to at least one other of the plurality of modules.

* * * * *